(12) United States Patent
Amado et al.

(10) Patent No.: US 6,898,601 B2
(45) Date of Patent: May 24, 2005

(54) SYSTEM AND METHOD FOR DIGITAL CONTENT PROCESSING AND DISTRIBUTION

(75) Inventors: Manoel Amado, Bristow, VA (US); Paul Bernard Wallis, Brooklin (CA); Michael Fremberg, Herndon, VA (US)

(73) Assignee: PhoChron, Inc., Bristow, VA (US)

( * ) Notice: Subject to any disclaimer, the term of this patent is extended or adjusted under 35 U.S.C. 154(b) by 0 days.

(21) Appl. No.: 10/444,341

(22) Filed: May 23, 2003

(65) Prior Publication Data

US 2003/0220905 A1 Nov. 27, 2003

Related U.S. Application Data

(60) Provisional application No. 60/383,297, filed on May 23, 2002.

(51) Int. Cl.[7] .............................. G06F 17/30; G06F 7/00
(52) U.S. Cl. ....................... 707/10; 707/104.1; 715/500
(58) Field of Search ................................. 707/10, 104.1; 715/300

(56) References Cited

U.S. PATENT DOCUMENTS

| | | | | |
|---|---|---|---|---|
| 5,181,162 A | * | 1/1993 | Smith et al. ................. | 715/530 |
| 5,220,657 A | * | 6/1993 | Bly et al. .................... | 711/512 |
| 5,293,475 A | | 3/1994 | Hennigan et al. ........... | 715/517 |
| 5,850,520 A | * | 12/1998 | Griebenow et al. ......... | 709/206 |
| 5,953,733 A | * | 9/1999 | Langford-Wilson ......... | 715/517 |
| 6,005,560 A | * | 12/1999 | Gill et al. ................. | 715/500.1 |
| 6,088,702 A | * | 7/2000 | Plantz et al. ............. | 707/103 R |
| 6,366,918 B1 | | 4/2002 | Guttman et al. ............ | 707/100 |
| 6,507,845 B1 | | 1/2003 | Cohen et al. ............... | 707/100 |
| 6,628,314 B1 | * | 9/2003 | Hoyle ........................ | 345/854 |
| 6,632,251 B1 | * | 10/2003 | Rutten et al. ............... | 715/530 |
| 6,826,534 B1 | * | 11/2004 | Gupta et al. ................... | 705/1 |
| 2002/0077848 A1 | | 6/2002 | Campbell ..................... | 705/1 |

FOREIGN PATENT DOCUMENTS

| | | | | |
|---|---|---|---|---|
| WO | WO 01/13287 A1 | * | 2/2001 | ........... G06F/17/60 |
| WO | WO 02/084517 A1 | * | 10/2002 | ........... G06F/17/24 |

OTHER PUBLICATIONS

Weinmann, E. "QuarkXPress 4 for Macintosh", Berkeley:Peachpit Press, pp. 136–140 and 227–230, 1998.*
McCullen, C. "Author! Author!", Technology and Learning, vol. 19, No. 8, p. 30, Apr. 1999.*
Phochron "YBonline: The Yearbook Website", product brochure, downloaded from www.phochron.com, undated.*
Phochron "YBpublish: The Collaborative Publishing Tool", product brochure, downloaded from www.phochron.com, undated.*
"Ctrl Print Key Features," Apr. 23, 2001, http://web.archive.org/web/20010423123244/www.ctrl-ps.com/print_key-fig.htm.

* cited by examiner

Primary Examiner—Luke S. Wassum
(74) Attorney, Agent, or Firm—Williams Mullen, PC; Thomas F. Bergert

(57) ABSTRACT

A publication system, method and apparatus simplifies end-to-end planning, building and printing of publications. The present invention allows a publication's audience and other third parties to submit content while allowing producers to collaboratively manipulate, proof and print the publication. The present invention provides in part a planning and budgeting tool that assists the producers in the initial stages of publication. The present invention can further provide a tool for custom publication development and loyalty marketing. In one embodiment, the invention can accept advertisement submissions electronically, and can afford advertisers the opportunity to receive exposure to potential consumers electronically during production.

39 Claims, 11 Drawing Sheets

FIG. 2

102 →
| Set access permissions |
| Budget planner |
| Invitations |
| Design planner |
| Set deadlines |
| Assign tasks |

FIG. 3

| Content collection, etc. |
| Manipulation |
| Visualization |
| Collaboration |
| Editing |
| Proofing |
← 104

FIG. 4

106 →
| Content arranged and approved |
| Flats and signatures finalized |
| Convert from digital to plate |
| Pass to printing press |

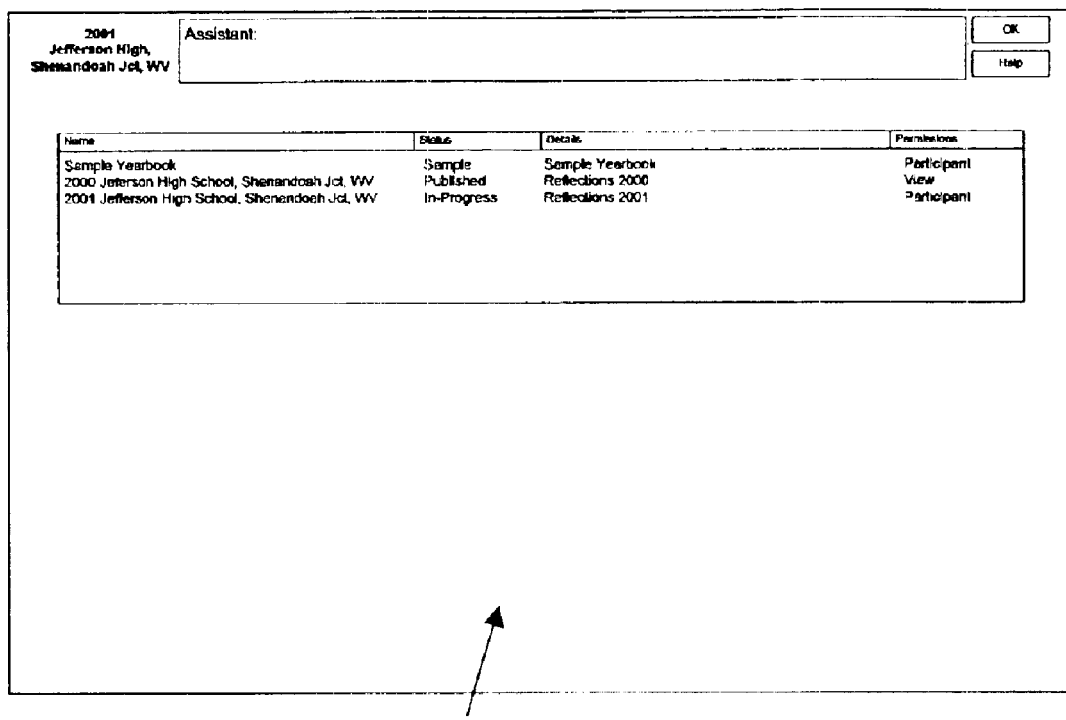
FIG. 9
FIG. 10
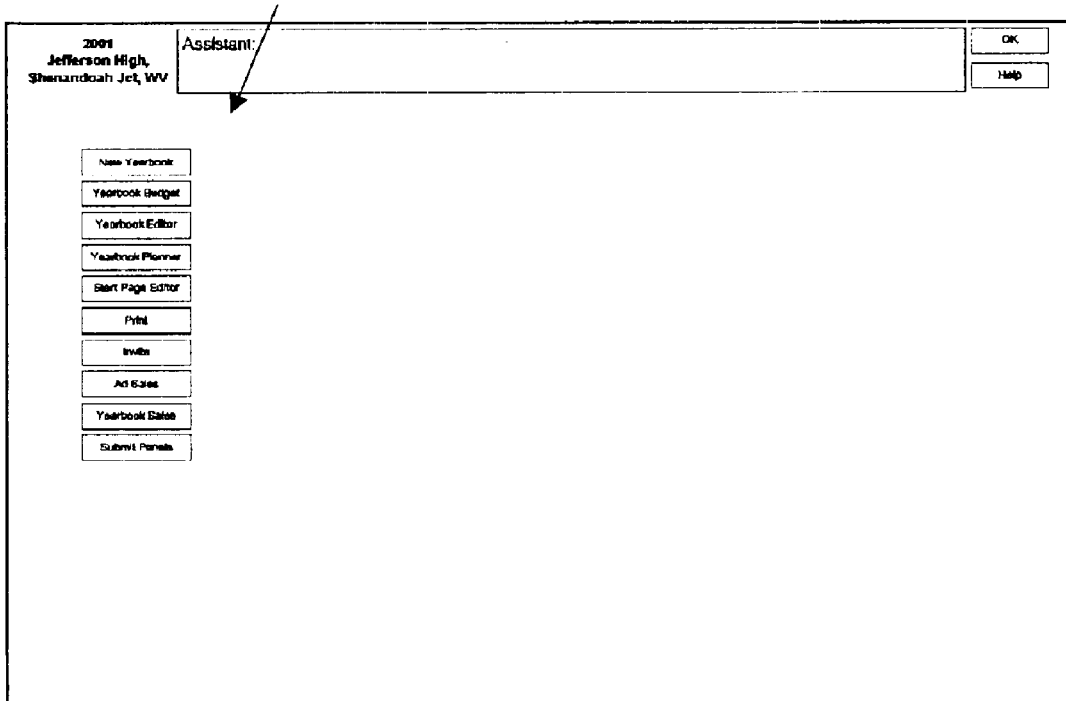

SYSTEM AND METHOD FOR DIGITAL CONTENT PROCESSING AND DISTRIBUTION

REFERENCE TO RELATED APPLICATIONS

This application claims the benefit of U.S. provisional application Ser. No. 60/383,297, filed May 23, 2002.

TECHNICAL FIELD

The present invention relates to digital content management, and more particularly to a system and method for simplifying and enhancing the planning, production and distribution processes for creators and publishers of printed and/or electronic materials. The present invention also facilitates the enhancement of publication loyalty through community and content contribution tools.

BACKGROUND ART

Since the advent of electronic communications, there have been many improvements in the way people and computers manipulate the text, graphics, layout and other content-related items in an electronic document. For example, Adobe Systems Incorporated (see U.S. Pat. No. 5,860,074) and Interleaf, Inc. (see U.S. Pat. No. 5,579,519) have received patent protection for various content manipulation tools and improvements. There have also been improvements in the way photographs are finished, expressed and made for sale electronically, as exemplified by patents issued to Eastman Kodak Company (see U.S. Pat. Nos. 6,173,992 and 6,288,719) and Picture Vision, Inc. (see U.S. Pat. No. 6,133,985). Further, there have been improvements in the ways people and publishers collaborate and assemble content to produce a finished product. Emedicine, Inc. (see U.S. Pat. No. 6,088,702), Taylor Publishing Co. (see U.S. Pat. No. 5,293,475) and various others have received patent protection in these areas.

DISCLOSURE OF THE INVENTION

Despite these advances, there remains a need for a system whereby a multitude of contributors can submit personalized content to a developing publication, and whereby upon submission, the organizers of the end publication can consider the submitted content as part of a richer content base than would otherwise be available. There is further a need for a system whereby the organizers and producers of the end publication can more easily collaborate on production, set calendar deadlines, plan layouts and budgets, implement monetization strategies and easily visualize their product throughout the creation process.

By the present invention, there is thus provided a system, method and apparatus whereby an end publication, such as a college or high school yearbook, for example, can receive electronic content contributions from its target audience and other third parties. Such broad participation creates more likely purchasers and a richer content base for possible inclusion in the final publication. The present invention also provides a system which eliminates much of the labor-intensive efforts of past publication methods, including pre-press at the printing facility, manual and repetitive tasks and ineffective collaboration processes.

The present invention provides in part a planning and budgeting tool that assists the producers in the initial stages of publication. The present invention further provides a collaboration tool that allows producers a simplified method of content manipulation during the building of the publication. Even further, the present invention provides a simplified method of taking the final proofs for a publication and producing the printed end product. In one embodiment of the invention, the present invention can accept advertisement submissions electronically, and advertisers can be offered the opportunity to receive exposure to potential consumers electronically during production. Further, the present invention presents several monetization opportunities not heretofore possible for participants in the production process.

BRIEF DESCRIPTION OF DRAWINGS

FIGS. 2 through 4 show block diagrams of the system components of FIG. 1.

FIGS. 9 through 16 show various graphical user interfaces which can be employed in connection with one embodiment of the present invention.

MODE FOR CARRYING OUT THE INVENTION

Figure 1:
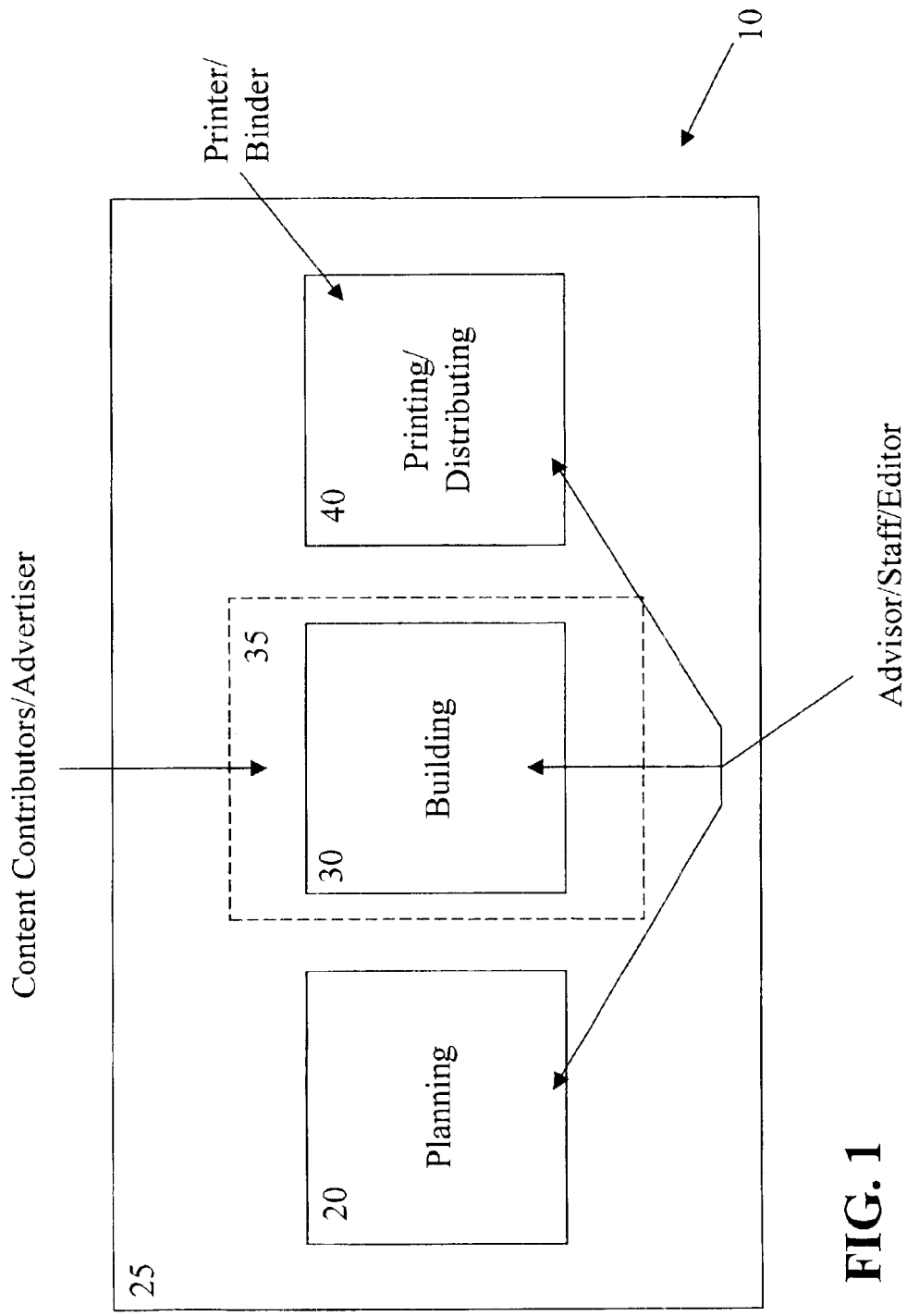
FIG. 1 shows a global block diagram of the participants and components involved in one embodiment of the present invention.

As shown in FIGS. 1 through 16, there is provided a digital content processing and distribution system 10 for the simplified production of a publication using a richer content base than is normally available. As shown in FIG. 1, there are typically three stages involved in producing a publication, such as a college or high school yearbook, for example. As shown generally at 20, there is a planning stage, whereby the desired features of the production are weighed against its cost, and where parties are assigned to individual responsibilities associated with the production. As shown in FIG. 1, in the yearbook example, advisors, editors and staff can be involved in the planning of a yearbook. In the planning phase, certain parameters associated with the end product are formalized, largely based on the publication's budget. These parameters can include the total number of pages, the number of color pages, the layout, and the sections, for example. It is within these defined parameters that the creative aspects associated with the production will be bound.

As shown at 30, the building stage of a publication comes after the planning stage, and involves collecting and creating content, organizing the content into the defined parameters, and managing the decision-making associated therewith. In the yearbook example, content has been traditionally created by staff members, with possible outside submissions considered in hard (non-electronic) format. The content base is therefore usually somewhat biased (intentionally or unintentionally) and limited, which can directly affect publication sales to outside parties.

As shown at 30 in FIG. 1, the present invention provides a system whereby outside content can easily be submitted by third party creators electronically. These third party creators can be actual end purchasers of the publication, such as students in the yearbook example, or photographers or other similar third parties who may be interested in submitting their content for possible beneficial business exposure.

While such third parties may have little influence over the ultimate inclusion and design of the publication, their participation can influence their decision to purchase the publication. Other individuals involved in the building phase of the publication include the staff, editors, and advisors or owners of the publication. As shown in FIG. 1, advertisers can also be involved at the content submission stage, as will be described later herein. In one embodiment of the invention, the present invention can track and maintain copyright ownership information of content submitters, including offering terms of submission to clear copyright ownership for the publication.

As shown at 40, the printing and distribution phase occurs after the building phase, and involves moving the assembled content from electronic format (as represented in flats and signatures, for example) into hard copy and/or electronic formats (such as CD or DVD, for example), ready to be bound and distributed. Distribution can occur electronically such as by communication over a network (e.g., the Internet), or via traditional hard copy distribution means, such as bulk transfer to a central retail location or individual copy mailings. As shown in FIG. 1, the present invention provides tools 25 and 35 that simplify these publication stages.

The individual stages associated with the invention will now be described in more detail in connection with the components of the present invention. As shown in FIGS. 1 through 8, the present invention provides components to facilitate the desired functions associated with the various stages of publication development. FIGS. 9 through 16 provide sample user interfaces, which can be used in connection with operating the present invention. In the planning stage, as shown in FIG. 2, planning component 102 is employed first to assist with scoping defined parameters for the production of the publication. Component 102 is a software tool which can be made available online through standard Internet connection, and which also can be employed over an internal network as an offline production tool. In one embodiment, tool 102 is part of a single complete tool (25 as shown in FIG. 1) designed to facilitate planning, building, printing and distributing the publication. Publication management members can initialize use of the tool 102 and set authorization and security access controls to ensure only proper individuals are provided access.

The production parameters are largely influenced by the budget available, so the tool 102 first assists with developing options for the publication managers based upon available budget. In this regard, the tool of the present invention can take a given budget provided by the managers to suggest options for number of pages, number of process color pages, type of cover, cover material, cover printing, cover embossing/debossing, cover foil stamping, number of copies to be produced, trim size, endsheets, organization of flats and signatures, and other budget-influenced parameters. In one embodiment of the invention, this tool can import previous year's data to show management past employed solutions (including ad and publication sales) and simplify the initial selection process.

The pricing information is stored and available via the budget tool to an authorized user member. The current pricing information is used to calculate both estimated and actual pricing. Estimated pricing is calculated from the parameter estimates. Actual pricing is calculated based on actual parameters chosen for the current publication. In one embodiment of the present invention, an immediate warning can alert the user of the planning component of any parameter selections which result in deviation from the estimated budget that is setup in the budget tool. In this way, the planning process always drives toward maintaining the overall budget target setup in the budget tool. This provides a significant advance in the system providing higher levels of customer satisfaction due to improved management of customer expectations from the earliest planning stage and all the way into production and distribution of the publication.

Figure 8:
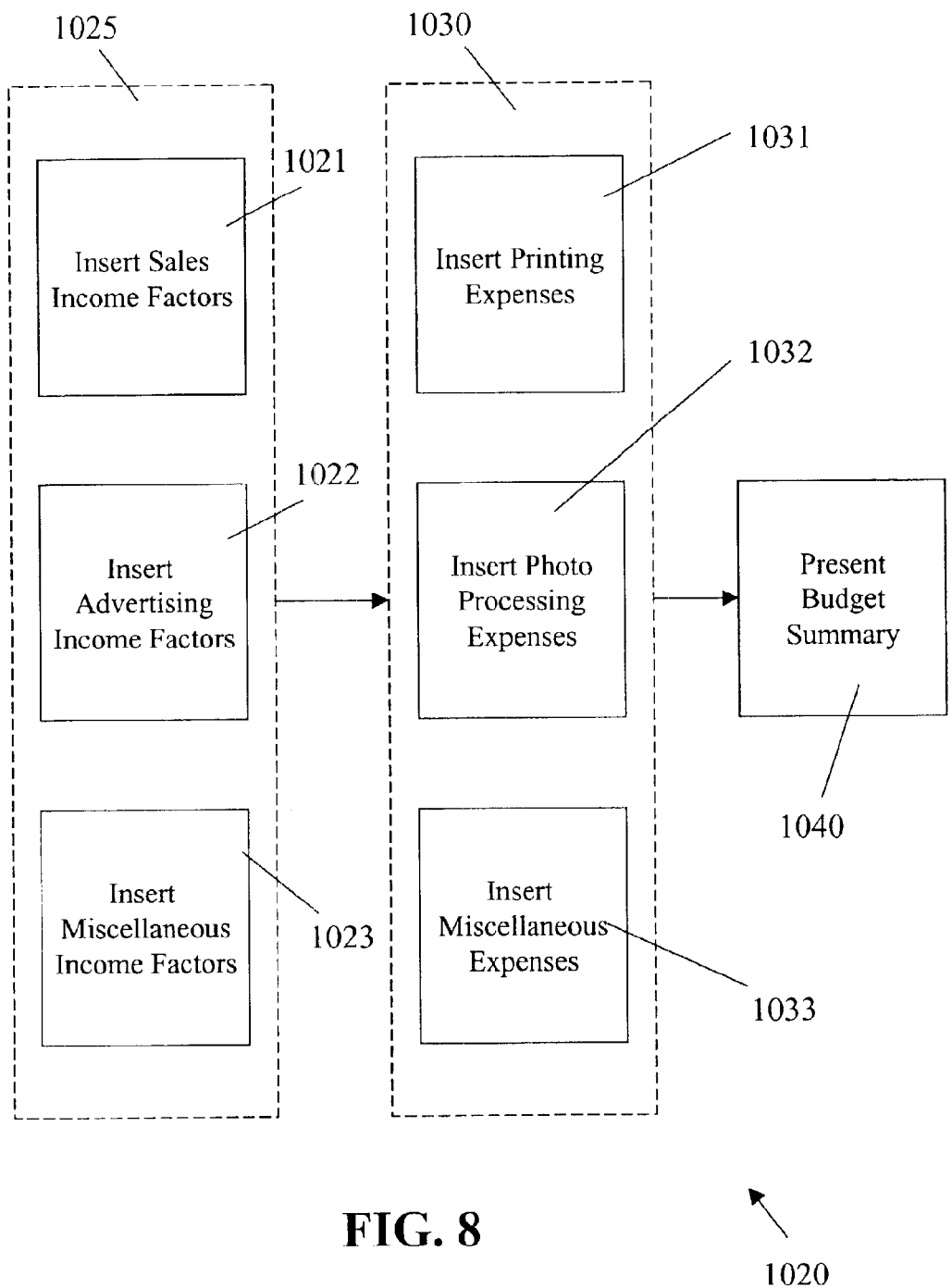
FIG. 8 shows a diagram of a budget tool for use in connection with one aspect of the present invention.

FIG. 8 shows a sample budget tool diagram 1020 and illustrates an approach to determining a budget summary in accordance with the present invention. The budget tool 1020 includes an income factor component 1025 and an expense factor component 1030. Income factor component 1025 can determine appropriate income factors to use in establishing a publication budget. For example, income factor component can have a sales component 1021 which can analyze information such as the initial offering price of the publication, dates of pricing increases, number of books estimated to be sold, and prior history of sales, for example. Income factor component can further have an advertising income component 1022 which can analyze information such as size, type and price of advertisements anticipated for sale in connection with the publication. Income factor component 1025 can further have a miscellaneous component to consider potential income from other sources, such as fundraising, publication signings, sponsorships, and third party service providers (e.g., photo portrait package sales), for example.

The budget tool can also include an expense factor component 1030 which can determine how various expense factors affect publication budgeting decisions. For example, expense factor component can include a printing expense component 1031, which can consider information such as the number of pages and color pages for printing, the variation in signatures for printing, as well as the end sheets, paper size, cover type and other physical considerations in the printing of the publication. Expense factor component can also include a photo processing expense component 1032, which can consider costs associated with numbers of headshots of students, for example, according to the number of students in each grade and the number of grades in the school, in the yearbook example. Expense factor component can further include a miscellaneous expense component 1033, which can consider items such as promotional costs, supplies and other ancillary expenses. Once the appropriate income and expense factors are considered, the budget tool of the present invention can compute and determine a budget summary 1040 for the publication. The budget tool can further allow publication producers to test the budget's sensitivity to particular items by changing the budget parameters and the values for those budget parameters.

Once the budget-defined parameters are established, the tool 25 assists in the further building, printing and distribution of the publication. Those given proper authority to manage the publication can be empowered to invite other individuals, such as staff and editors, to help develop the publication in phase 30. The publication administrator can be provided with access and rights to all functionality provided within a specified publishing collaboration. For example, the administrator can have exclusive access to create and remove a publication, add or remove a new user, assign and change the role of each user, re-assign any page reservation, setup and modify budget parameters, and approve pages to be published and/or sent to the printing plant. Publication administrators, advisors, managers and developers can be collectively called publication producers.

As shown in FIGS. 1 and 3, the building or development stage of the publication incorporates a larger number of participants. As previously described, the present invention facilitates content submission by a wide range of individuals. In one embodiment, a separate interactive content interface tool 35 can be employed to allow content submission via a private or public network, such as the Internet. Using the tool 35, for example, members of the publication's greater community can interact with publication editors and staff, and provide text and graphic content submissions for consideration by publication staff. In this way, the system of the present invention allows for outside participation while the publication is in development, creating publication loyalty and "buy in" at earlier stages than traditionally available. In one embodiment of the invention, outside party content submissions can be categorized by the submitter so as to assist the publication editors and staff in filtering the wide range of submitted content appropriately. In one embodiment of the invention, the system of the present invention can allow outside parties to purchase individual photographs or content submissions for personal use. Outside parties who might submit content or otherwise interact with the system of the present invention can include image content providers, photo processors, printers, text content providers, advertising content providers, graphics content providers, and page layout template content providers.

Upon acceptance of an invitation to help produce a publication, the invited individuals can be given a user name and password or other similar credential to allow access to various levels of program functionality. For example, a yearbook advisor may invite several students to be section editors, and once the students accept their roles, the tool of the present invention can give these editors access to one or more publication development areas of the tool. An access control component in accordance with the present invention enables at least one member to obtain authorized access to the publication and optionally add or remove additional members of the publishing collaboration. The access control component can identify a member of a publishing collaboration through a login process by, for example, receiving a user name and password or other authentication means. In one embodiment, section editors can be given limited access to their section only. In another embodiment, section editors can be given access to all content sections or selected content sections at the will of the advisor or administrator. Further, users with proper authority can revoke accesses previously granted, as well as deny access upon receiving user access requests. The access control component can be implemented as a software tool which is part of the planning component 20 of the present invention.

Figure 5:
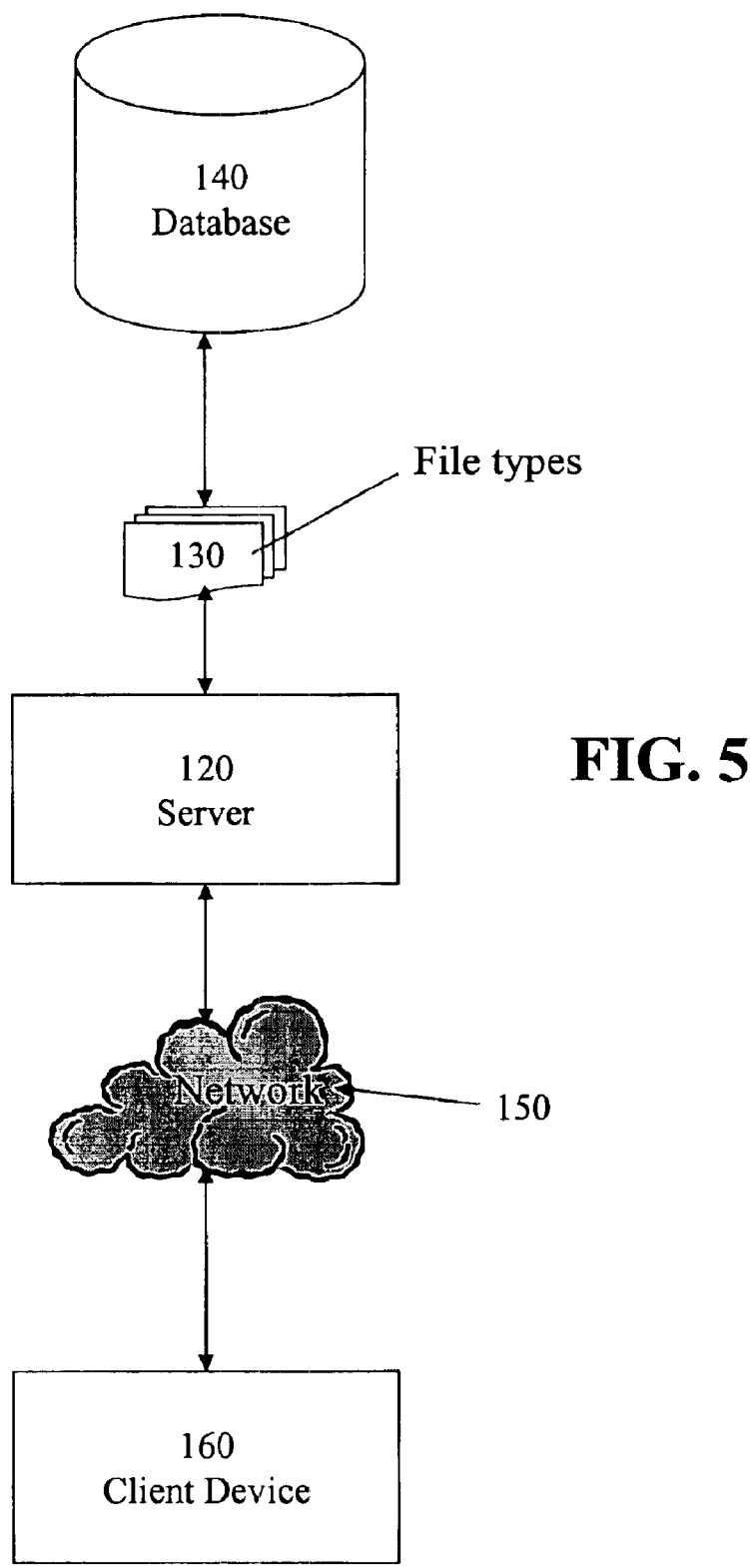
FIGS. 5 and 6 show diagrams illustrating information flow in accordance with one embodiment of the present invention.
Figure 6:
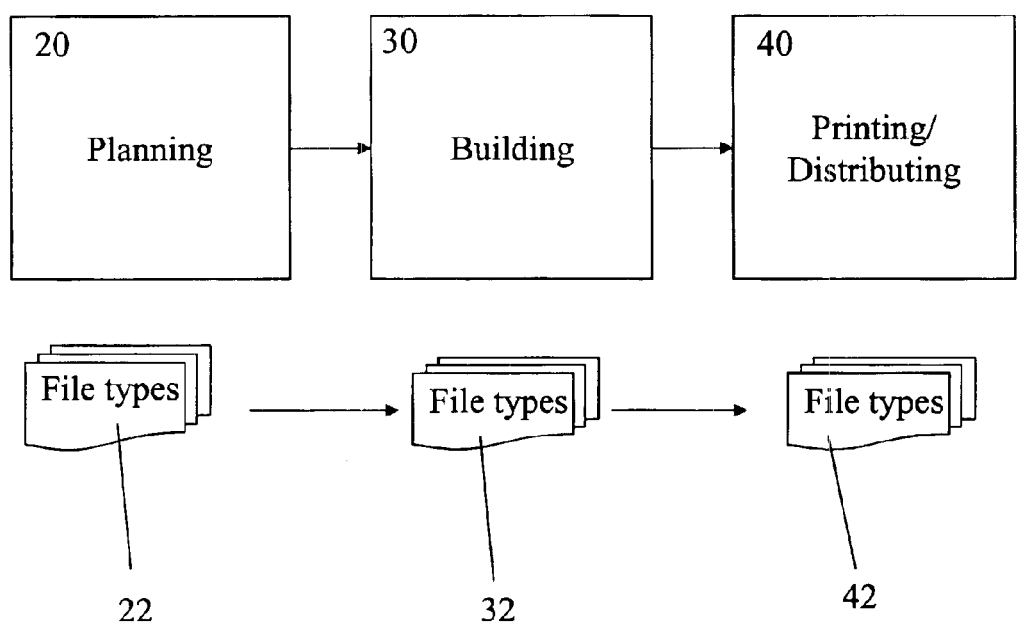

FIGS. 5 and 6 show diagrams illustrating user access, interaction and information flow in accordance with one embodiment of the present invention. As shown in FIG. 5, client device 160 allows a user to access the system of the present invention via a network 150 such as the Internet, for example. In this embodiment, the system of the present invention is represented by server 120 and database 140, and the file types manipulated and stored are represented as at 130. The user 160 can be an administrator, editor, staff or other publication producer. The user 160 can further be a content submitter, publication subject, third party service provider or other entity empowered to interact with the system of the present invention, as described earlier.

As shown in FIG. 6, various file types 22, 32, and 42 can be processed by the present invention depending on the stage of production of the publication. In the planning stage 20, image files (e.g., jpeg, tiff, bmp), text files (e.g., Microsoft Word™, Word Perfect™, ASCII text, rtf) and graphics files (e.g., eps, svg, gif) can be submitted to the server of the present invention for storage. During the development stage 30, the server in accordance with the present invention can store publication pages in a proprietary vectorized graphics format ("PVG" format). Such PVG files reference stored content, and turn a flat page description into a description having meaning in the content sense.

In one embodiment, the PVG files can be processed and read using a scalable vector graphics viewer, such as SVG™ from Adobe Systems Incorporated, for example. An example of specific PVG tags which may be used with the present invention are shown below.

---

<pvg>—specifies the PVG page layout
    width—width of page spread
    height—height of page spread
    viewBox—coordinate system to map to
    <desc>—page description
    <lastModified>—specifies the date the page layout was last modified.
    date—date of last modification
<template>—specifies template information
    family—template family
    name—template name
<colorspace>—specifies template information
    type1—color space of first page
    type2—color space of second page (2 page spreads only)
<rect>—specifies an SVG rectangle
<circle>—specifies an SVG circle
<ellipse>—specifies an SVG ellipse
<line>—specifies an SVG line
<polyline>—specifies an SVG polyline
<polygon>—specifies an SVG polygon
<image>—specifies an SVG image
<text>—specifies text
    <dropcap>—specifies a drop cap character within a text element
        type—dropcap type
        size—size of dropcap (# of lines)
        font-family
        font-style
        font-variant
        font-weight
        font-stretch
        font-size
        text-decoration
        fill—fill color
        fill-rule
        fill-opacity
        stroke—stroke color
        stroke-width
        stroke-linecap
        stroke-linejoin
        stroke-dasharray
        stroke-dashoffset
        stroke-opacity
    <textSpan>—specifies a span of text
        font-family
        font-style
        font-variant
        font-weight
        font-stretch
        font-size
        text-decoration
        fill—fill color
        fill-rule
        fill-opacity
        stroke—stroke color
        stroke-width
        stroke-linecap
        stroke-linejoin
        stroke-dasharray
        stroke-dashoffset
        stroke-opacity

---

As shown in the screen reproduction 900 in FIG. 9, for example, the user or a publication administrator may be provided with a user interface that allows the user to select which publication he or she will interact with during a particular session. It will be appreciated that the system of the present invention can host multiple publications at a single time, whereby an individual user may have administrative authority for a first publication, input and editing authority for a second publication and no access rights to a third publication, for example. As such, each user may be provided with an interface which allows the user to initially select the particular publication with which the user desires to interact. As shown in the screen reproduction 1000 in FIG. 10, the user can also be provided with a user interface having a menu of available options for interacting with a given publication. For example, the user may desire to call up the particular publication's budget information, planning information, or advertising or publication sales information. The user may further desire to edit, print, or add content to the current publication, or may desire to invite additional users to assist in the production of the publication, for example.

Figure 11:
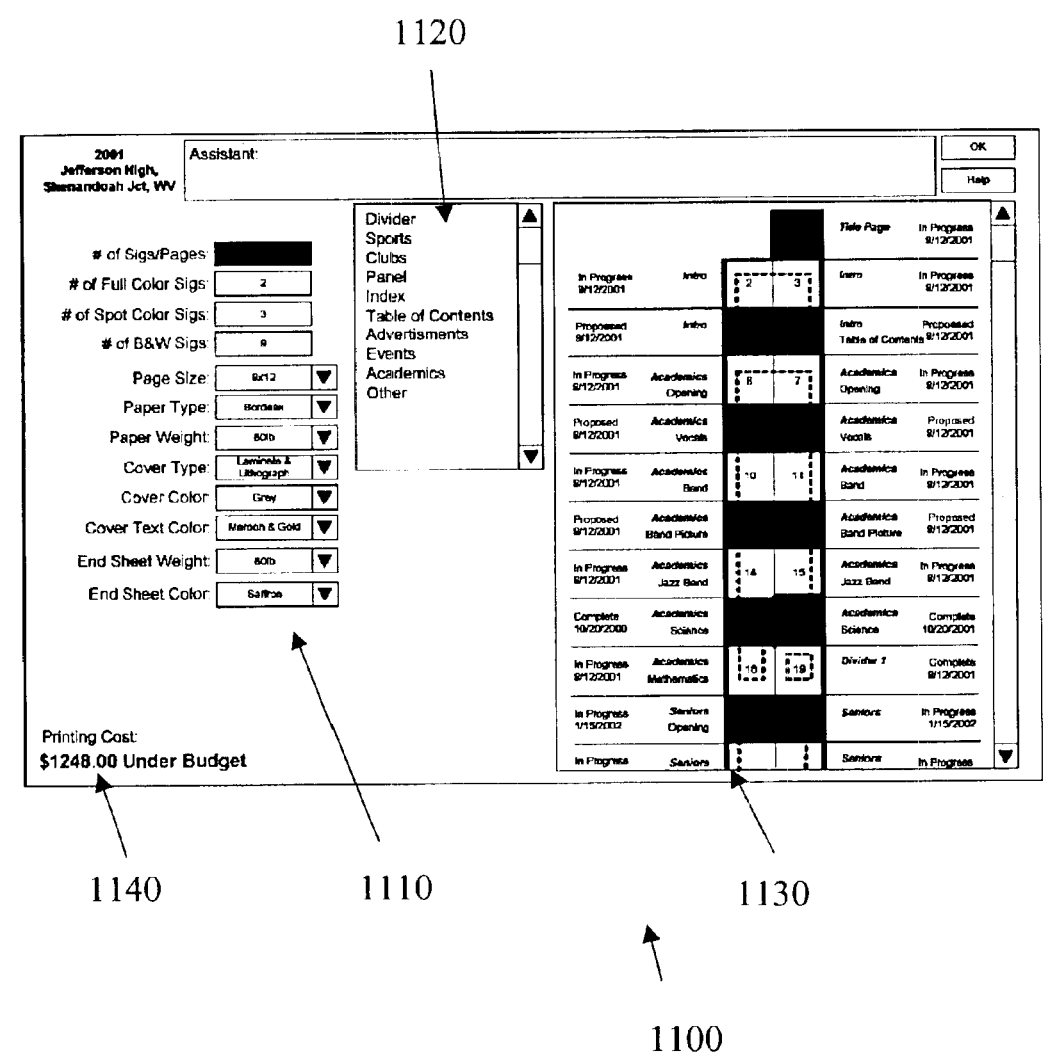

FIG. 11 illustrates an example screen reproduction 1100 of a planner user interface in accordance with the present invention. As shown in FIG. 11, the planner user interface can provide details about the physical structure 1110 of the publication, content segments 1120 of the publication, the status 1130 of portions of the publication, and budget summary information 1140, for example.

Figures 12, 13:
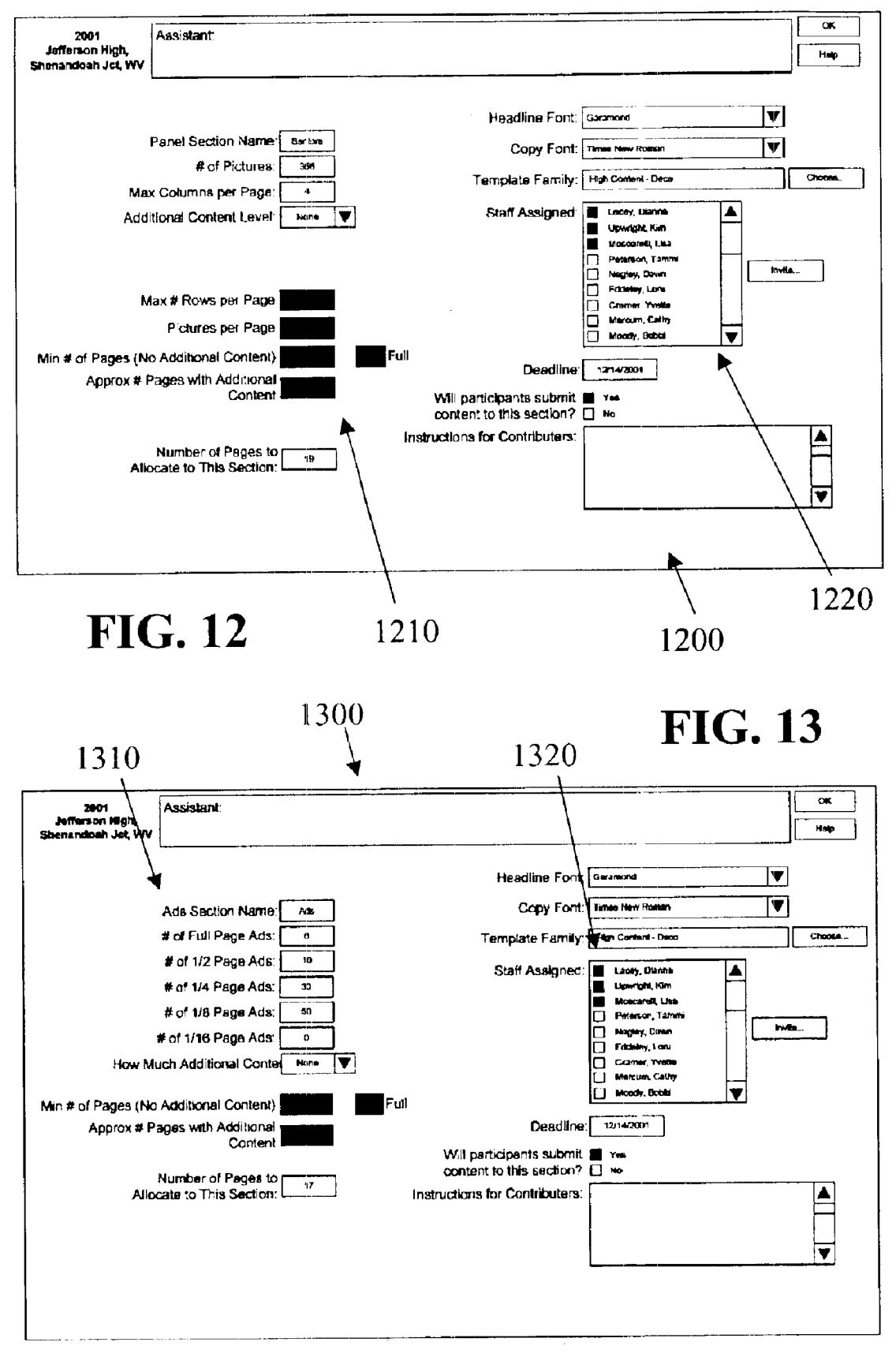

The advisor can work with editors and staff to assign tasks and deadlines, and appropriately calendar these deadlines using the tool of the present invention. When publication staff and editors access the tool of the present invention, they can subsequently be provided with notices and alerts about personal upcoming deadlines. In one embodiment, the tool of the present invention can interact with an electronic mailing subsystem so as to provide notification and alerts via e-mail. In one embodiment of the building tool 104, development "wizards" can be offered which simplify aspects of the building phase. For example, panel pages, index pages, and the table of contents may be developed using software wizards provided as part of tool 104. As shown in FIGS. 12 and 13, for example, there are provided screen representations of a panel section development user interface 1200 and an advertising development user interface 1300, respectively. Each interface can include section presentation determinants 1210, 1310 such as the physical boundaries of the particular content or layout being organized, for example. The interfaces can further include information pertaining to additional production members who may be contributing to the particular section 1220, 1320, for example.

Figure 14:
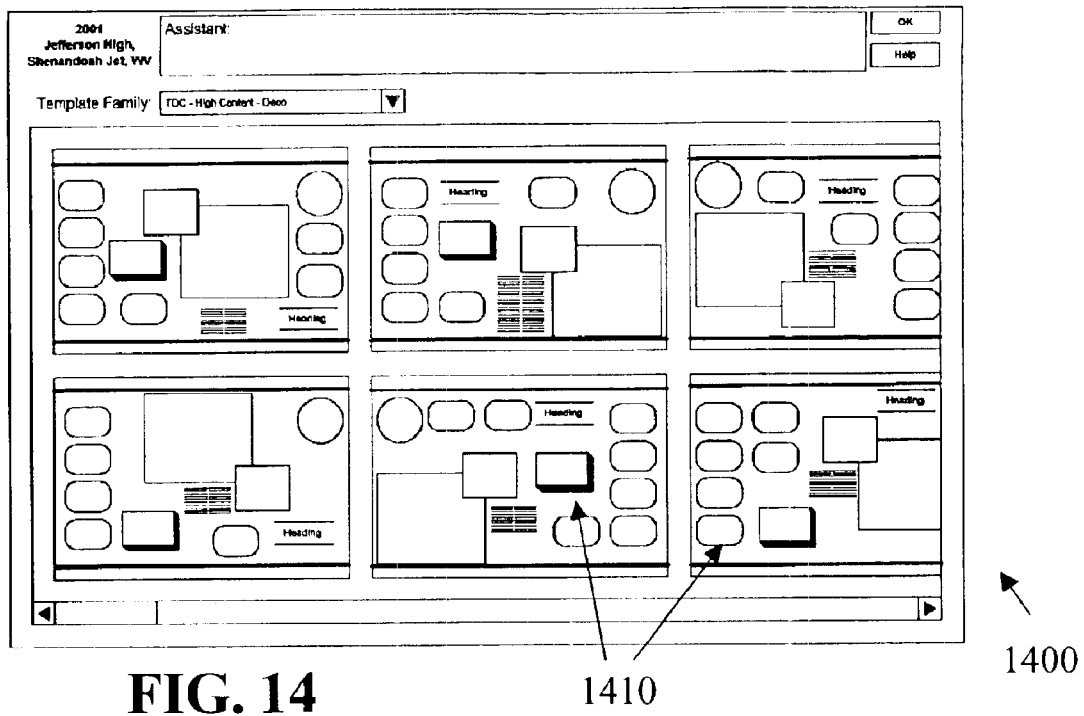

With regard to the layout and design of the pages in each section, the advisor and/or editors and staff can participate in selecting templates for use with the publication. As shown in FIG. 14, for example, a template family menu interface 1400 can provide the user with numerous templates 1410 to use in presenting the layout of various pages of the publication. In one embodiment of the invention, the tool of the present invention can import past year's data to show what templates had been used previously. The tool can also provide sample templates and template families to assist in this decision process.

In one embodiment of the present invention, the development component 30 allows for exclusive editing rights to be granted to a publication producer on a per-page basis. The user with exclusive access to a page can place a pre-defined page layout template on a client device display, modify the pre-defined layout template or create a new layout template on this reserved page of the publication. A user with exclusive access can subsequently add content to the page layout. In one embodiment of the invention, only one user can obtain exclusive access to a page of a publication in work at any one time. However, other users can view and provide comments pertaining to pages for which they have no editing rights.

Figure 15:
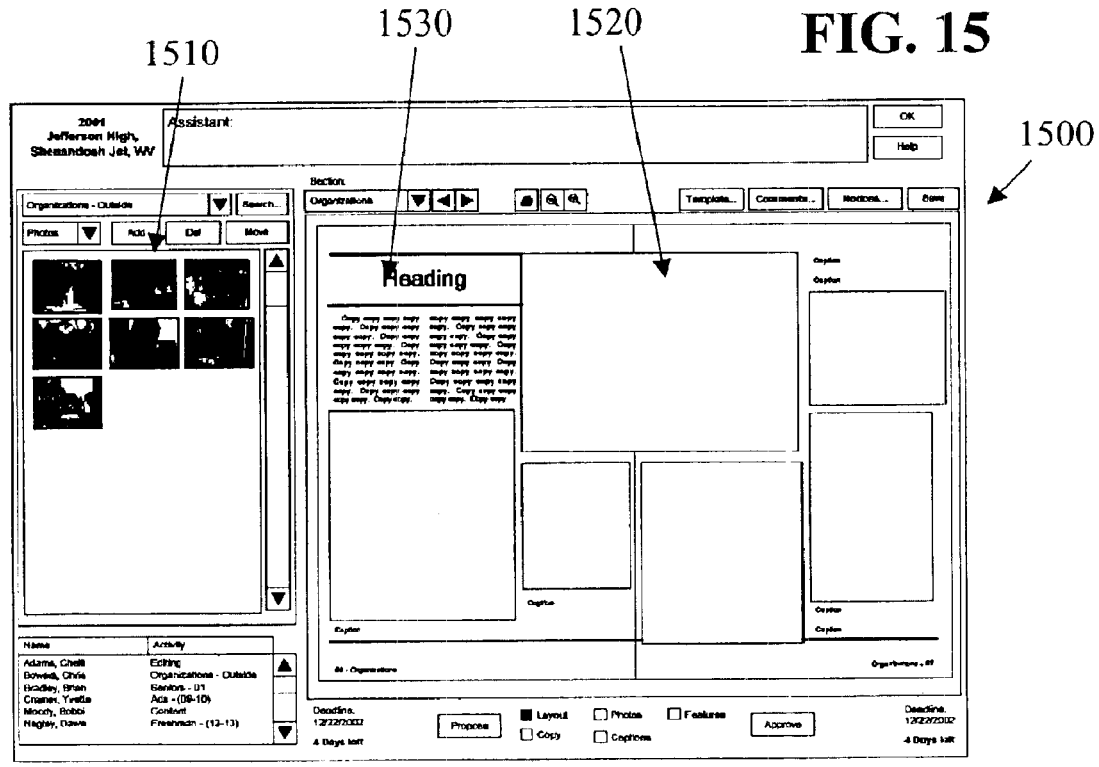

FIG. 15 shows a sample user interface 1500 for manipulating content within a specific page of the proposed publication. The user can view specific image files 1510, and can experiment with how different images or text appear on the page. In one embodiment, the present invention allows the user to "drag and drop" image or other visual representations over a specific page portion to view the page-specified content associated with the image on the given position on the page. For example, the user may drag an image file over a section 1520 of the page designated for photo images, and the user would see the image at that location. If the user drops the image into the pre-defined area for images, the user could then manipulate the image using functionality well-known in the editing field, such as by cropping the image, re-sizing the image, or adding or removing color from the image. In one embodiment of the invention, the entire page layout, including which sections of a page are in color and which in black and white will have been pre-established and the user would not be able to change that aspect of the page layout. If the user were to drag the image over a portion of the page pre-determined for text content 1530, any text associated with the image, such as image metadata or other text content, can be shown to the user at this interface location. This can assist the user in determining appropriate content matter and location in constructing the particular page for which the user is responsible.

The development component 30 thus provides for editorial review process where editors approve different elements of each page, including photos, graphics, copy, layout, and publishing form. The different elements of each page can be locked with each corresponding approval, meaning that no authorized user can modify the approved elements on an individual page. An authorized user can remove the approval to allow continued modification of those elements on a page. For example, if a photo editor approves the photographs on page five of a publication, no members of the collaboration would later be able to change the photos selection on page five of the publication. In one embodiment, if the approval status changes for a particular page, all authorized members of the publishing collaboration would detect a change of the approval status for the given publication page.

The page-level approval mechanism allows the system of the present invention to automatically verify the editorial review of each page. In one embodiment, the production component can signal an alert to the authorized user upon any attempt to publish pages that have not been approved for all page element types. The production parameters can specify whether the system is to simply provide a warning in this instance or simply prevent the publishing function to proceed to send pages to the printing plant.

The page-level approval mechanism further provides a progress tracking mechanism for the publication effort. The development component can produce a progress report that details the percentage of pages approved in each element type as well as the overall number of pages in the publication. The publication's rate of progress and time-to-complete can also be estimated by the present invention based on this metric. Historical progress data can be used to refine the future estimates.

The development component 30 further provides font control by making use of a centralized list of fonts that are supported. This list of fonts is shared with all members of all publications and can be updated any time a user is interacting with the system so as to synchronize with the rest of the publication collaboration. The font list can be used to restrict the use of unsupported fonts and indicate the current use of unsupported fonts. The list can also be used to update all members of the collaboration with the supported fonts for use in viewing, editing and proofing of pages in any publication.

Figure 7:
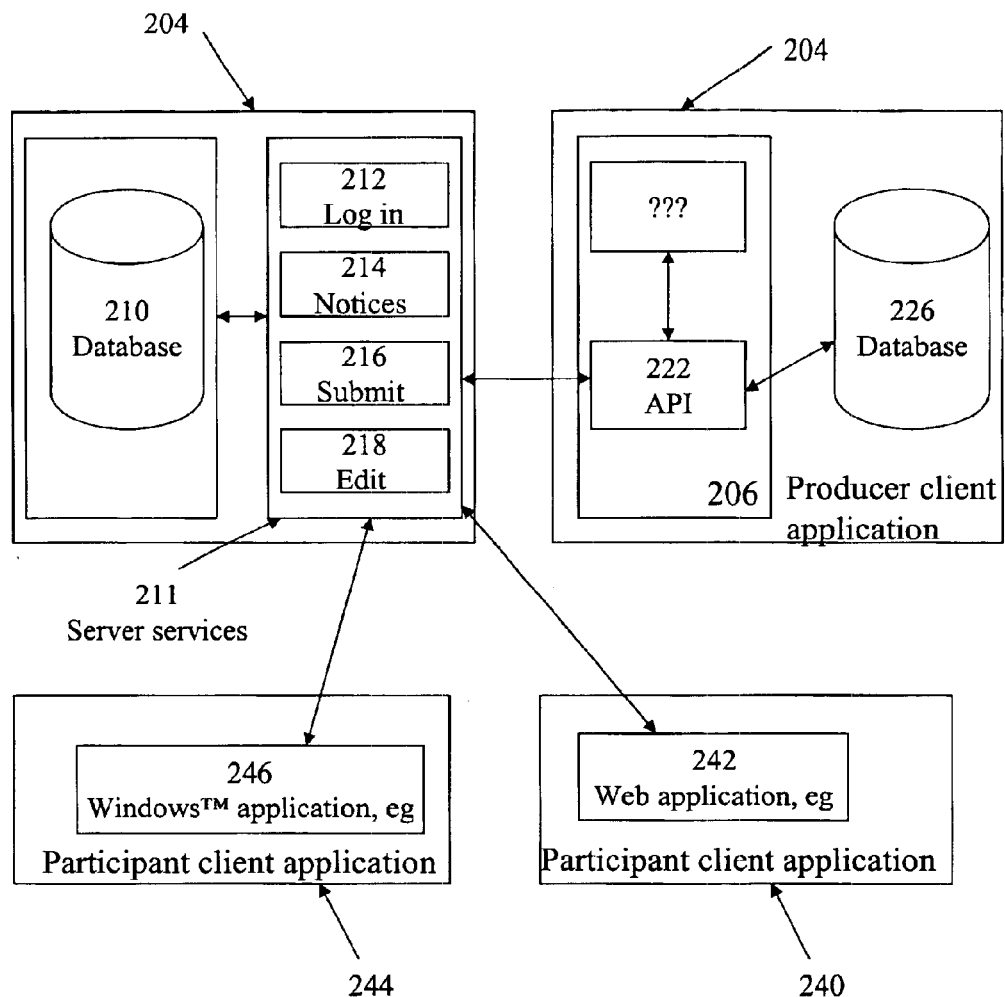
FIG. 7 shows sample interaction capabilities between various client types and the server applications of the present invention.

FIG. 7 illustrates sample interaction capabilities between various client types and the server applications of the present invention. As described earlier, content submitters can use the online interactive tool (35 in FIG. 1) to interact with their own personal interface page via Internet connection. The present invention provides a database interface through which staff, editors and advisors can access information stored online. In one embodiment of the invention, server side Active Server Pages™ can be employed to generate user-requested pages. Client devices in accordance with the present invention can include client applications 204 for staff and other publication producers, and client applications 240, 244 for participants such as content contributors, for example. Client application can be a web (Internet) application 242 as well as a Microsoft Windows™ application 246 or an application capable of running within other common operating system environments, for example.

Server services 211 can include specific web services operable to execute functions such as logging in 212, sending notices 214 inviting others to participate, or submitting 216 or editing 218 pages, for example. As shown in FIG. 7, these web services can be employed by staff operating the tool 25 of the present invention via a client side application programming interface (API) 222 using a Windows™ application 206, for example. Alternatively, these web services can be employed by a third party participant via a Windows™ or web application, to the extent authorized by previously defined access standards. In one embodiment of the present invention, certain Microsoft™ web services can be implemented to facilitate greater personalization and added functionality.

Client side communication with the system of the present invention can occur via standard web browser over standard Internet communication protocols using well-known HTML, XML and SOAP formats, for example. Additional local client-side applications may also be incorporated to facilitate content submission and manipulation. Such third party programs may include, for example, Quark™, Page Maker™, InDesign™, Illustrator™, PhotoShop™, Family Tree Maker™, PictureIt!™, MS Publisher™, PhotoDeluxe™, and Classmates.com™, for example. Using these third party applications, users can create and export page templates for use by the publishing tool of the present invention. In one embodiment, the present invention provides a separate plug-in tool to assist in this process. These third party application can also gain access to the content database. For example, Classmates.com could make use of the student information and photos.

The invention can also be accessed by mobile devices using a further mobile software component operating for example in the Windows CE™ or Palm™ environment. Any and all e-commerce features are made available to the mobile Pocket PC™ or Palm™ user, and the mobile user can gain access to the system using the same credentials used to access the online component.

Figure 16:
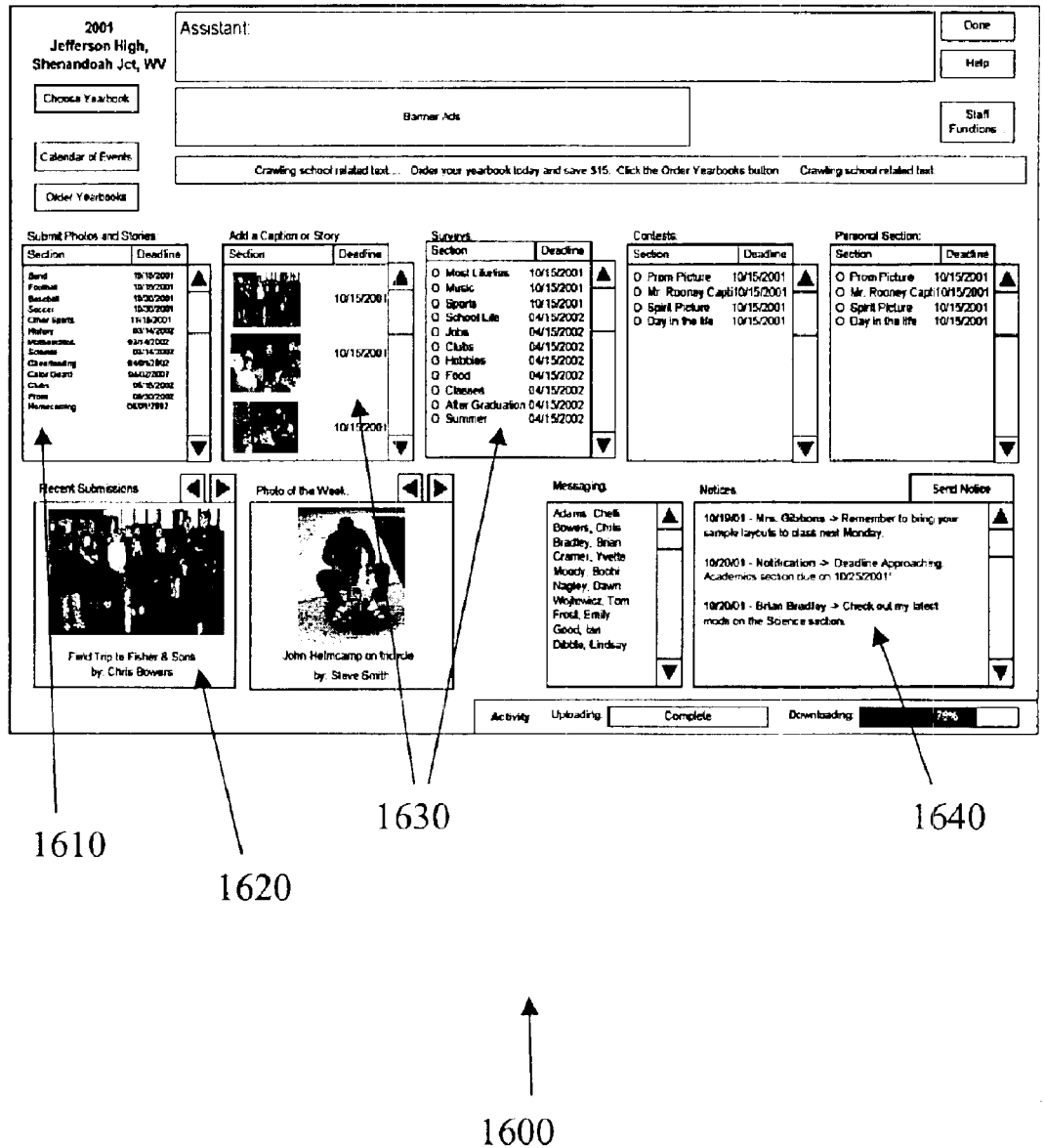

FIG. 16 shows a sample user interface 1600 which allows a content submitting user to interact with the system of the present invention. This user interface 1600 can include, for example, a list 1610 of submitted photos and stories, recent submissions 1620, interactive components 1630, and messaging capabilities 1640 to provide a complete interactive environment for the user.

The system accepts content contribution using file type constraints to prevent downstream problems with the inclusion of content into a publication. In one embodiment, the content file type constraints can include minimum and desired pixel resolution of photo images, minimum, maximum and desired word length of text copy, minimum and desired pixel resolution of advertisement images, and supported file formats for images and text (e.g., JPEG, TIFF, text file, Microsoft Word™ document), for example.

In one embodiment of the invention, content submissions are not tied to specific page organization for the publication. Thus, a content submission need not designate that it is intended for a specific section of the publication; rather, the publication producers can determine the preferred location for placing the content. The present invention allows an authorized user to create any hierarchial n-tiered organization deemed useful to the collection of content for a given collaboration. For example, in the production of a high school yearbook, an authorized user can choose to create separate sections for band, science team, and sports. Within the sports section, there may be a basketball, football, field hockey and soccer section. Within basketball, football and soccer, there may be junior varsity and varsity sections, and men's and women's sections within each of the junior varsity and varsity sections. The organization of this content will be shared with all members of the collaboration during the online synchronization with the rest of the collaboration. The graphics content can be made available automatically to one of several publication categories which is determined by the access control component.

In one embodiment, the development component 30 can receive content and convert it to a standard format. In the case of copy submission, the original text file format can be converted into plain text and the original file can be discarded. In the case of photographic and advertisement images, the original image file can be converted into a low-resolution image in RGB (red, green, blue) color space. This low-resolution image can be used by any member of a collaboration at any client device to render a specific publication page for editing or proofing. In one embodiment, the high-resolution version of the image can be archived into long-term storage where it can be retrieved during the publication component when pages are rendered and sent to the printing plant.

The development component supports color management in order for the user to view a WYSWYG ("what you see is what you get") electronic display on a client device. As such, all current pages of the publication can be simultaneously viewed by all members of the collaboration according to the color space assignment made in the planning component. For example, if a page is assigned to the grayscale color space in the planning component, all content on this page will be displayed to the user by the development component in the grayscale color space. This demonstrates the advantage of integration of the planning phase into the publishing system of the present invention.

In the planning and later stages, the tool of the present invention can also receive and record ordering information for the publication. It is often the case with certain publications that sales orders are taken before the actual publication is available to help finance publication costs. The tool of the present invention can record pertinent information related to such sales, including in one embodiment, credit information for processing electronically via the Internet as is known in the art. In a further embodiment of the invention, editors can use knowledge of publication sales information to determine which freely submitted content will be approved for inclusion in the final publication. In another embodiment of the invention, the consideration or inclusion of content in the final publication can be communicated in order to drive sales.

As the content is being received from outside contributors, the publication staff and editors may also be generating their own content for the publication. Further, the staff and editors in this stage can use the publishing tool 104 of the present invention in assembling and managing all of the content according to their defined parameters and scheduled deadlines. In one embodiment of the invention, at this building stage, publication editors and staff can simply manipulate content as needed to fit the specified template for each section. For example, a section editor can pull three photograph submissions from his or her section's database of available photographs and place them into a defined template which calls for three photographs of various sizes. Using the tool 104 of the present invention, the editor can temporarily crop the selected photographs to fit the template-required size. The editor can also manipulate the location of the selected photographs using a simple "cut and paste" function of the tool of the present invention. If the publication staff is working collaboratively with other staff or an editor on a particular section, the individual manipulating the content can save their version of the particular page for later viewing by other collaborative partners. Further, the system of the present invention allows such staff to post comments related to their suggested creative arrangement. Staff may also print "proofs" of their work locally, such as via a network printer, to review drafts of their work.

The development component 30 provides the authorized user that has not reserved or received exclusive access to a page of the publication with page viewing functionality. This allows for editorial review and comments from any member of the collaboration. The development component further provides the authorized user that has reserved or received exclusive access to a page of the publication with page editing capabilities to modify page template parameters. Page modifications can be instantly shared with all members of the collaboration or can be maintained privately until the authorized user wants to share the page modifications with all of the members. In another implementation of the invention, the page modification can be shared with any subset of the members as designated by the authorized user.

The tool 25 of the present invention stores all of the user and publication information, including budget, defined parameters, user names and access credentials, selected templates, content for populating the templates, and any other information affecting the final publication in a system database. This database will be described more completely in the remaining description.

The tool 35 can be further employed to provide earlier advertisement exposure to the targeted publication audience. While a publication advertiser may typically be limited to exposure in the physical copy of the publication, the system of the present invention allows advertisements to appear in the content submission and other community-related areas of the tool. Other community-related areas can include interactive features such as contests, surveys, publication and/or school promotions, event notices, and the like.

As shown in FIG. 4, the present invention includes a further tool 106 which can be used by advisors, staff, and editors to assist with printing and distribution of the developed and formatted content. With the layout and content in place within the templates, and the templates in place within the flats and signatures of the publication design, the publication can be printed. The proofing and publication components of the present invention support color management in order to provide the highest level of color accuracy that the proofing device allows. This can be accomplished by the use of ICC (International Color Consortium) profiling to adjust for the specific color rendering of computer displays/monitors and digital printers. ICC profiles are included in the PVG page description language of the present invention, as will be described more completely hereinafter.

The production parameters ensure the highest level of production automation can be achieved at the printing plant with no need for manual work with typical commercially available pre-press tools. The production parameters allow the system to create vectorized electronic page files (e.g. PDF/X or EPS) which can be automatically processed by commercially available RIP (raster image processing) software. Once the vectorized electronic page files of the present invention are processed by RIP software, a printing plant can print ready-to-go paste up pages and use a film camera to convert to film which then can be sent to a traditional printing press. Alternatively, the printing plant can use a direct-to-plate device to transfer the electronic page file to film which then can be sent to a traditional printing press. Or, the printing plant can use the electronic page file to print directly to a digital printing device such as a digital printing press, a digital copier/printer, or any other digital printing device capable of print directly from a digital source file. The publication component can load balance to submit publications to printing plants in order to achieve the optimal distribution of all publications. The printing plant network does not need to be managed by a single authority/entity.

The system of the present invention can be used to plan, create and distribute a personalized publication where content of some portion or all the publication is customized for a group of consumers or a single consumer. The planning component supports this scenario by allocating a sequential set of pages which can be printed and inserted into the publication for distribution to at least one consumer. The development component can support this by allowing each user to create a customized set of pages that would be included in the publication that is distributed to each corresponding consumer. In this embodiment, the production component can provide the necessary order tracking information to the printing plant, which can include: sequence number, full name, address, order number.

The system of the present invention can also provide the consumer with the ability to select element-based characteristics such as photo border style, backgrounds, colors, etc. A user can use the development component of the present invention to select the desired element style for a single page, a set of pages or the entire publication. The customization of the publication cover can be supported via cover templates that are selected using the development component. Further customization can also be supported by allowing a user to select text and photo elements to be placed on the cover or any page of the publication.

The publishing component allows an authorized user to indicate that a set of pages of the publication is ready to be sent to production. The production parameters (e.g., cut marks, borders, signature requirements) are pre-selected in order to automate the proper rendering of files that can be automatically processed by the RIP & in-position software and workflow at the printing plant.

As previously described, the pages of a publication are created and stored on a centralized server by the development component. These pages are rendered at the server for proofing and publication, and can be sent electronically (e.g. over the Internet or private network) to a printing plant where they are queued for processing by the workflow at the printing plant. Cached files can be stored in XML (eXtensible Markup Language) during the development stage. During the output or publication stage 40, the output files 42 can be stored in SVG, PDF, raster (e.g., jpeg, bmp), or HTML format depending on the particular publication. While not shown, the present invention can render pages in a PDF (portable document format) during a proofing stage, which can be considered part of the development stage of a publication.

The proofing component can be used for direct and instant accurate page layout and text proofing of each page using any digital printing device that is available to any user with authorized access to a publication. This user can also use the proofing and publishing components to request a page approval proof which includes accurate layout, text and photos in either electronic or physical (printed) formats. The instant layout and text proof can be rendered with low resolution photo images and can be used as approval proofs depending on service and customer requirements. The more accurate approval proof that is requested by the proofing component is provided to the user by the publication component.

The processing queue marks sequential pages as ready for production based on the signature requirements of the printing plant and the specifics of the print order. For example, short runs of less than 100 books can be printed on a digital press which optimally prints on 4-page signatures but larger runs can be printed on a conventional printing press which optimally prints on 32-page signatures. The processing queue can mark sequential pages as ready for production once the necessary pages are ready to fill a signature requirement. The processing queue can further confirm the production parameters with the order specification data and alert the operator at the printing plant of possible errors in either the order data or the production parameters. This reduces the chances of costly production errors and increases the opportunity for improved customer satisfaction in the overall service delivery.

The planning and development parameters are automatically limited by the production parameters. Planning and development parameters can include, font selection, color space selections, paper/trim sizes, signature format (32-page, 16-page, 8-page, 4-page, 2-page, 1-page), cover selection, paper selection, deadlines, and budget/costs, for example.

The proofing component of the present invention can convert from the PVG page files and the corresponding low resolution RGB photo images to PDF file to provide an immediate proof using either a conventional electronic display (computer monitor) or a commercially available digital printing device. The publication component can convert from PVG page files and the corresponding high resolution CMYK (cyan, magenta, yellow, black) photo images to PDF/X file to provide the printing plant a file that can be securely processed without the need for manual pre-press operations. This PDF/X file can be processed by the RIP software at the printing plant where two PDF-IT are generated. One PDF-IT is created with each of the C,M,Y,K channel all combined together for the purpose of approval proofing (final approval to indicate to the printing plant that a page can be printed) on either a conventional electronic display (computer monitor) or a commercially available digital printing device. The second PDF-IT is created with each C,M,Y,K channel separated out in order to send on to the RIP software and in-position software that automatically prepare for production printing.

With regard to monetization using the present invention, the yearlong attention of students provides a very powerful target market opportunity in the yearbook publication example. In other publication examples, editors and content contributors will also invest significant attention to viewing interfaces associated with the present invention, and these interfaces can be supplemented with advertising content as deemed appropriate. As examples of advertisers in the yearbook context, mass retailers, clothes manufacturers, music companies, and consumer electronics suppliers can purchase ad space or sponsor various contributions in connection with the yearbook development.

In one aspect of the invention, providers of advertising content can submit advertising content to be published and distributed with the end version of the publication, as well as separate advertising content to be displayed on user interfaces when the various users interact with the system of the present invention. In one embodiment, the advertising content can be designated for a particular affinity group (e.g., sports, dance) so that users editing, contributing or otherwise interacting with publication content associated with that affinity group will be exposed to the targeted advertising content. In a further embodiment of the invention, upon a consumer customizing a publication for individual consumption, the system of the present invention can determine appropriate advertising content to display and or publish in connection with the end publication according to user profile or other identifying information. For example, the consumer can be prompted to submit subject areas of interest, which the system of the present invention can use to determine relevant advertising content to be placed into the publication. Or, the consumer's customized publication selections can be analyzed to determine relevant advertising content to be placed into the publication. For example, a user selecting a publication including basketball, bowling and camping sections for a customized publication can be presented with sporting goods retail advertising material.

Additionally, users can place orders to purchase publications online. In one embodiment, they can pay with a credit card (using Microsoft wallet™ or Paypal™). Price changes can be based on a pricing schedule that the adviser sets up in tool 25. Further, the user can place the order to purchase an ad in the yearbook online, with pricing and payment arranged as just described.

Photos that were submitted to yearbook efforts over a previous time period (e.g., 3 years) can be made available for retail purchase. Depending on the retailer providing the local printing service, many products might be available such as small and large prints, posters, mugs, and t-shirts, for example. It will be important in operating the present invention that a user (probably from the yearbook staff) be assigned the administrative responsibility to maintain and support the private web site that aims at getting a wide range of effective participation and contribution to the yearbook effort. In one embodiment, the admin functions are available to the user that provides the login username of 'admin' and the corresponding password. If this password is lost or forgotten, the adviser must request a new password from support. The functions provided to the administrative user can include setting up submission sections and deadlines, surveys and contests, Photo of the Week Display, Submit MyPage and MyBox functions and school promotions.

Other monetization opportunities could include: Alumni Directories, Class Reunions, Class Rings, and Photography Services.

The following example is an illustration of a practical implementation of the present invention.

In a sample yearbook publication project, the system of the invention brings together all of the players involved in the project, including the Advisor (Teacher), Editors, Staff, Students, Teachers, Parents, Local Advertisers and the Printer. The advisor initiates the school's yearbook effort with the yearly registration process. This process makes sure that unwanted or unauthorized yearbook efforts are not allowed for any school. The adviser is authenticated and given complete control of the collaborative effort.

Access to the school yearbook effort is by invitation only. An email invitation prompts an individual to participate in the school yearbook effort. Advisers, editors and staff must use a username and password to login to the tool 25 and participate in the school yearbook effort. The tool 25 can restrict capabilities and functions based on the role that the user was assigned when the user was invited to join the collaboration. The assignment of roles determines the functions that are made available to the user.

In one embodiment, there can only be one adviser for each school, who may be provided with complete control and authority over the project. The adviser has exclusive capability to police the submitted content and participant's conduct. The adviser initiates the yearly collaboration, and is prompted to invite the editors and administrative staff. The adviser usually sets up the budget prior to inviting the editors to start working on the yearbook. The adviser also has the exclusive capability to submit pages and any reprint requests to the printer.

The editors invite staff and participants. The editors are typically responsible for most aspects of planning out the book, including the page size, the color pages, the cover type, the theme, the layout, etc. The editors are responsible for managing the yearly project such as tracking staff assignments to make sure the key events are covered. The editors must review, comment, edit and approve page proposals.

The editors use the planner tool 102 to determine the yearbook's content structure and thematic layout. Book-wide decisions such as the page size and the cover type and color are specified in the planner. All of the sections of the book are specified. Page-wide decisions are also made in the planner such as mapping every page of the book to a section. The progress status of each page of the book is tracked as in-progress, proposed or complete. The submission deadlines are also tracked for each page.

Printing costs are computed as decisions are made and the editors can know immediately if they are under or over the specified budget. The planner is also used to assign staff to work on sections of the book and provide advice and instructions to help guide the staff's efforts.

The adviser sets up a budget that the editors and staff will maintain. Book and ad sales are entered and tracked by sales staff. The costs of the book are also computed based on the editor's decision. Historical information from the previous year can help make critical estimates such as a useful list of the businesses that have purchased ads in previous years. This information is useful to the current year ad sales effort or the number of panel pages needed in previous years.

The page editor provides a means to create, edit, review and approve each one-page or two-page spread that have been assigned by the editors in the planner tool. A user (one of the users that has been assigned to work on this section) chooses from the template family that the editors have selected/designated for each section of the book in the planner tool. The user then drags and drops photos and copy onto one-page or two-page layouts from the content manager. The user proposes the spread when satisfied with their work on the page. All participants in the yearbook effort can view and comment on the proposed page. A user assigned to the page's section can make further edits to a proposed page (perhaps based on comments made by editors or the adviser). Editors can additionally edit any proposed page and approve the page which locks the page and ends all further editing on the page. An approved page can be unlocked by an editor to allow edits, if necessary, as long as the page has not been published (i.e. sent to the printer).

Panel page (i.e. the pages containing the individual photos and name of each student) creation is greatly simplified. The template is chosen for each page and the portrait photos are automatically inserted as they are made available from the portrait submission. The index is also very easy to create using the present invention. The template is chosen and the index information is automatically inserted from the copy and quote submissions that are index tagged.

The content management tool 104 organizes all photos, quotes and copy submitted to the yearbook effort. The tool 104 organizes and associates all submissions into the sections of the book that are designated in the planner tool 102. Photos, quotes and copy submissions can be grouped together for easy access and placement into the page layouts. Content that is placed in a proposed/approved page disappears from the content view for all participants. This content view behavior ensures that content is used in only one place in the book and eliminates the need to rework pages with new content.

Portrait photos can be submitted to the yearbook effort from a professional photographer. In some cases the photos can be provided in digital format (tiff or jpeg). The student name, class information and file name of corresponding photo is also provided in a text file. This digital submission can be made from a CD on a standard format (Photo CD or Josten's™ CD, for example) or directly uploaded. The CD submission can be imported by any staff participant. The upload can be performed by the photographer.

The photos can also be provided on 3×5 or 4×6 prints. Such prints may need to be scanned to convert into a digital format (tiff or jpeg). The student name, class info and file name of the corresponding photo is manually entered. This submission can be made by any staff participant.

Any portion of text in caption or copy that is placed on a proposed (but not approved) page can be referenced in the index by attaching an index tag to this text. When the index is created automatically with the page editor all index tags are used to create the index.

The user is guided through a step by step decision process aimed at helping achieve the necessary high level tasks. This is a "Turbo Tax™" approach to creating the yearbook with a large group of people. The participants keep track of all the events that need to be covered. Editors can send notices to staff asking them to cover certain events. Staff can volunteer to cover any event. The editors can always keep track of what events are covered and who is covering the event. A "Help" offering may provide an online user's guide and reference manual, a tour guide that shows the user how to use the main features of the invention, a contact system provider for product support, a check for online software updates and notices, and a customer feedback reporting systematic problems and asking for new functions and features.

Short text comments can be created and viewed for each page of the book viewed with the page editor. These comments are used by the staff working on pages of the book to get ideas and suggestions and respond to editorial comments and requirements. Any participant can send a notice (i.e. a short text message) to any group of participants, and some notices can be sent automatically. These system notices are sent to alert the user about scheduled events or to alert the user about a problem that needs attention. The notices are displayed to the recipients the next time they login to either tool 25 or 35.

Participation is by invitation only. The invitation is sent by email, which can be sent in a web browser (i.e. html) format that provides an online links to: download the tool 25 application, download system plug-ins, and access the online web site (tool 35). This email can provide the user step-by-step instructions that help them easily join the yearbook effort. The invitation also specifies the role of the participant. A participant can play the following roles: adviser, editor, staff or anyone. The system of the present invention will assume certain rights and privileges based on the assigned role of the invited participant. The invitation can also be supported via instant messaging. Microsoft Messenger™ service will be supported. AOL Instant Messenger™ may also be supported in one embodiment.

An extensive collection of page template layouts is available or can be provided by a template content provider interacting with the tool of the present invention. This collection is mainly organized by a unique and comprehensive set of themes. The template layouts are developed thematically in order that a consistency can be supported throughout a book. The templates are further subdivided into template families. These families are all fundamental derivations of a single basic template design. A suggested design principle says to choose templates from a single theme and use a single template family for a chapter or section of the book.

The user can use an inexpensive color/photo printer to print proofs. State-of-the-art color management (i.e. ICC profiles) makes it possible for proof quality prints to be made on supported printers. Even non-supported printers will provide very good proofing capability. Any user can use a local printer to print out proofs. This gives the user a great ability to immediately preview the final product. This is a very powerful tool for both the creative and editorial staff.

The submission of pages to be printed at the press can only be made by the adviser, in one embodiment. The pages to be submitted must be indicated and the order must be confirmed. If the submission contains any pages that have not been approved, the adviser is altered and a cancellation is recommended. The adviser is given the choice to override this alert and the submitted pages are approved and submitted. The submission status can be monitored by all participants.

In the yearbook example, tool 35 can be used to create an interactive portal enabling the entire school community to participate in the yearbook creation process. Member schools receive their own web site allowing students, teachers and parents to submit content to the yearbook creation effort. Students can also participate in surveys, contests, promotions and even place yearbook and advertising orders online. In this embodiment, access to the school's online site can be restricted by the yearbook staff, and can be by invitation only. An e-mail invitation, for example, prompts an individual to participate in the school's yearbook effort. The individual uses a username and password to access their school yearbook effort at the online site. The submission of photo, quote and story can be made from any computer with access to the Internet via a web browser. The participant can upload images from a digital camera, a scanner or image files(s). Photos, quotes, stories and captions can be submitted together or individually. Content submitted together can be considered to be closely related. Each content submission can optionally be categorized into either one of the sections of the book or the other categories setup by the editorial staff.

The users may be provided with a personalized submission page, whereupon submissions can make up a unique addition to the book that only a group of students will purchase and receive. Additionally, the staff can request personal submissions from students that could be included anywhere throughout the yearbook. For example, students can be allowed to submit a jpeg photo containing anything they want. All of the pictures can be put in boxes that are to be randomly placed all over the book with the name of the student prominently attached to their submittal. Surveys can request that users provide their answers to any and all surveys that the yearbook staff may include in the current yearbook publication. For example, this would provide a student an easy means to vote for the cutest boy or girl in school. Through contests, for example, aspiring artists can gain recognition and fame submitting their photos and creative writings to the yearbook effort. Contest winners can be announced online and their work can be submitted to print. Further online possibilities include creating a "Photo of the Week" contest, whereby a photo is chosen from the week's submittals as the best photo. The criteria for this choice can be created and implemented by the yearbook editors or staff. School promotions, such as a crawling promotional banner can rotate through messages that are setup by the yearbook staff, for example. As a specific example, the message banner may be used to let students know to buy their yearbook in the next week and save 30% off the regular price.

Further enabled functionality provided by the present invention can enable the participants to keep track of all the events that need to be covered. Editors can send notices to staff asking them to cover certain events, staff can volunteer to cover any event and the editors can always keep track of what events are covered and who is covering the event. Such functionality provides any student a convenient access to an online calendar of school events and can help to keep drawing the attention of the student to the submission and participation in the yearbook effort. Also, any participant can send a notice (i.e. a short text message) to any group of participants. Some notices can be sent automatically. These system notices are sent to alert the user about scheduled events or to alert the user about a problem that needs attention. The notices can be displayed to the recipients the next time they login to either tool 25, 35 in connection with the invention.

The present invention extends the scope of the automation from the earliest phases of planning to the costly pre-press stage of production for the publication. This results generally in automation which can both reduce the cost of production (labor is reduced at all phases) and provides a richer content base and greater opportunities for inclusion and customization.

Labor is reduced for content contributors where the content can be transferred for immediate use in the publication without the need for an intermediate step (such as providing photos on compact disc that might be lost or stored on a bad disc). Labor is reduced for the advertising content submission and purchase. The system tracks advertising content submissions and provides an accurate indication of availability of advertising space to an authorized user. The system uses advertising parameters that are supplied by an authorized user to check the advertising submission for possible errors such as resolution, aspect ratio of the advertising image supplied, advertisement contact name/address/phone number, advertising type identifier, or submission deadline, for example. The system provides for automation of advertising content placement into selected areas designated on any of the pages of the publication using the planning component. For example, ¼ page color advertisements can be automatically placed into ad space on any page of the publication as specified in the planning component.

Further in accordance with the present invention, labor is reduced for planners who can be sure to choose parameters that will be supported by the printing plant. Labor is further reduced for developers who are constrained by both planning and production parameters and are not required to have any knowledge of these constraints. Using the present invention, producers are given immediate access to all content contributions, and can work anytime and anywhere. The present system also makes it possible for greater and broader participation, thereby reducing the workload on each participant.

Additionally, by using the system of the present invention, labor is reduced at the printing plant. For example, no labor is required for digital pre-press due to the ability of the system to provide PDF/X files which can be sent directly to the printing device. There is no need for resolving problems with photo images or fonts, as may be experienced with commonly used commercially available software packages. Additionally, there is no need for resolving problems with unsupported or erroneous parameters such as spot color, trim size, bleed area, or cut marks, for example.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

What is claimed and desired to be secured by Letters Patent is:

1. A system for content processing and publication, comprising:
   a planning component enabling at least one member of a first user type from a first client device to establish at least one publication parameter for a content publication and at least one criteria for receiving content contributions from at least one member of a second user type, said at least one publication parameter being constrained by a budget pricing tool, said budget pricing tool allowing said first user type member to establish an available financial budget and calculate an actual cost for said content publication, said budget pricing tool further associating a price with said at least one parameter;
   a development component enabling said at least one second user type member to upload content to a server from a second client device, said server storing said content, said development component further enabling said at least one first user type member to retrieve said uploaded content for use in said publication as constrained by said at least one parameter;
   a proofing component enabling said at least one first user type member to render at least a portion of said publication for viewing electronically via a client device; and
   a publication component for producing said publication.

2. The system of claim 1 wherein said at least one publication parameter is a parameter taken from the group consisting of: publication size, portion of publication in color, publication sections, page layout specifications, electronic file types, color space assignment, page assignment, assignment deadline.

3. The system of claim 1 wherein said second user type is taken from the group consisting of: image content provider, photo processor, printer, text content provider, advertising content provider, graphics content provider, and page layout template content provider.

4. The system of claim 1 wherein said at least one criteria is based on identification of said second user type as at least one of: publication consumer, publication subject, publication content provider, publication advertiser, publication producer.

5. The system of claim 1 wherein said at least one criteria is based on content type constraints.

6. The system of claim 1 wherein said development component includes a content management component for receiving, viewing, editing, organizing, describing and searching content.

7. The system of claim 1 wherein said development component can receive content in a plurality of electronic file types, and further wherein said proofing component can render said publication in Portable Document Format (PDF) or Encapsulated Postscript (EPS).

8. The system of claim 1 wherein said development component can receive text content and convert said text content to plain text, said development component further being capable of receiving image content, storing said image content, and converting said image content into a low resolution image.

9. The system of claims 8 wherein said low resolution image is in RGB (red, green, blue) color space.

10. The system of claim 9 wherein said development component further converts said plain text and said graphics into a vectorized graphics format.

11. The system of claim 10 wherein said proofing component converts said vectorized graphics format and said low resolution image into Portable Document Format (PDF) or Encapsulated Postscript (EPS).

12. The system of claim 1 further including an ordering component whereby said system can receive and process an order to purchase said publication.

13. The system of claim 1 further including an access control component whereby said at least one first user type member can allow access to retrieve said content for said publication to at least one additional first user type member.

14. The system of claim 1 wherein said development component allows a plurality of members of said first user type to collaborate and manipulate said stored content at the same time.

15. The system of claim 14 wherein said content is stored in units of individual pages and wherein at most one of said plurality of members can manipulate said stored content for an individual page at a given time.

16. The system of claim 1 wherein said publication component can prepare files for said publication to be printed directly using at least one of the processes consisting of: (a) convening from digital format to film, film-to-plate and using a traditional printing press; (b) converting from digital format to plate and using a traditional printing press; (c) converting from digital format to print with a digital printing press.

17. The system of claim 1 wherein said publication component can produce said publication based on at least one production parameter taken from the group of parameters consisting of: type of publication, pricing and service requirements.

18. The system of claim 1 wherein said publication component can produce said publication in a physical form, said form being from the group consisting of: hardbound publication, softbound publication, physical digital storage medium.

19. The system of claim 1 wherein said publication component can produce said publication in electronic form.

20. The system of claim 1 wherein said publication component can further distribute said publication.

21. A method for content processing and publication, comprising:
    providing a planning component enabling at least one member of a first user type using a first client device to establish at least one publication parameter and at least one publication production constraint for a content publication and further allowing said at least one first user type member to establish at least one criteria for receiving content contributions from at least one member of a second user type;
    providing a development component enabling said at least one second use type member to upload at least image content to a server using a second client device, said server storing said content, said development component further enabling said at least one first user type member to retrieve said uploaded content for use in said publication as constrained by said at least one parameter and manipulate said content as constrained by said at least one publication production constraint, said development component capable of assembling said content in a vectorized graphics format;
    providing a proofing component enabling said at least one first user type member to render at least a portion of said publication for viewing electronically via a client device; and
    providing a publication component for receiving approval of said proof from said first user type member, whereby said publication component can assemble said content associated with said proof into a format which can be directly processed by a raster image processing component, thereby producing said publication without the manual use of a pre-press tool.

22. The method of claim 21 wherein said at least one publication parameter is a parameter taken from the group consisting of: publication size, portion of publication in color, publication sections, page layout specifications, electronic file types, color space assignment, page assignment, assignment deadline.

23. The method of claim 21 wherein said second user type is taken from the group consisting of: image content provider, photo processor, printer, text content provider, advertising content provider, graphics content provider, and page layout template content provider.

24. The method of claim 21 wherein said at least one criteria is based on identification of said second user type as at least one of: publication consumer, publication subject, publication content provider, publication advertiser, publication producer.

25. The method of claim 21 wherein said at least one criteria is based on content type constraints.

26. The method of claim 21 wherein said development component allows a plurality of members of said first user type to collaborate and manipulate said stored content at the same time.

27. The method of claim 26 wherein said content is stored in units of in individual pages, and wherein at most one of said plurality of members can manipulate said stored content for an individual page at a given time.

28. An article of manufacture comprising a computer instruction carrier, readable by a computer, tangibly embodying one or more instructions executable by the computer to perform a method of processing and publishing content, the method comprising the steps of:
    providing a planning component enabling at least one member of a first user type using a first client device to establish at least one publication parameter and at least one publication production constraint for a content publication and further allowing said at least one first user type member to establish at least one criteria for receiving content contributions from at least one member of a second user type;
    providing a development component enabling said at least one second user type member to upload at least image content to a server using a second client device, said server storing said content, said development component further enabling said at least one first user type member to retrieve said uploaded content for use in said publication as constrained by said at least one parameter and manipulate said content as constrained by said at least one publication production constraint, said development component capable of assembling said content in a vectorized graphics format;
    providing a proofing component enabling said at least one first user type member to render at least a portion of said publication for viewing electronically via a client device; and
    providing a publication component for receiving approval of said proof from said first user type member, whereby said publication component can assemble said content associated with said proof into a format which can be directly processed by a raster image processing component, thereby producing said publication without the manual use of a pre-press tool.

29. A target marketing tool, comprising:
    a server for storing content for use in a content publication project, at least portion of said content received from at least one end purchaser of a publication to be developed through said project, said publication project having at least one stage of production, said server further storing programming for manipulating said stored content and producing said publication;
    a first user interface for receiving advertising content during said at least one stage of production of said publication;
    a second user interface for manipulating said stored content, said second user interface including a display that includes at least a first portion of said advertising content, wherein said at least a first portion of said advertising content is targeted to the content manipulator;
    a third user interface for said at least one end purchaser to submit said portion of said content, said third user interface including a display that includes at least a second portion of said advertising content during submission of said content by said at least one end purchaser and prior to said content publication being produced, wherein said at least a second portion of said advertising content is targeted to the end purchaser; and wherein said server can produce said publication to include at least a third portion of said advertising content, wherein said at least a third portion of said advertising content is targeted to the end purchaser.

30. The tool of claim 29 wherein said at least one production stage includes a development stage and a publication stage, and wherein said first user interface can receive a first advertising content submission for presentation on said second user interface during said development stage and a second advertising content submission for presentation on said publication during said publication stage.

31. An order fulfillment tool for fulfilling orders for a content publication, said content publication including content submitted by a user, comprising:
   a server for storing content for use in said content publication;
   a content publication tool operable by said server, said publication tool having a planning component, a development component and a publication component, said planning component enabling a producer to establish at least one publication parameter and at least one publication production constraint for a content publication and further allowing said at least one first user type member to establish at least one criteria for receiving content contributions from said user, said development component enabling said user to upload content to said server and further enabling said producer to retrieve said uploaded content for use in said publication as constrained by said at least one parameter and manipulate said content as constrained by said at least one publication production constraint, said development component capable of assembling said content in a vectorized graphics format, said publication component capable of receiving approval of a proof from said first user type member, whereby said publication component can assemble said content associated with said proof into a format which can be directly processed by a raster image processing component, thereby enabling production and printing of said publication without the manual use of a pre-press tool; and
   an order processing component operable by said server to receive and process a content publication order.

32. The tool of claim 31 wherein said order is received from said user.

33. The tool of claim 31 wherein said received order is for a specified portion of said content publication.

34. The tool of claim 33 wherein said specified portion is determined by a budgeting tool.

35. The tool of claim 33 wherein said specified portion is specified according to a required number of pages of said publication.

36. The tool of claim 33 wherein said specified portion is specified according to a color selection.

37. The tool of claim 31 wherein said received content is advertising content, said advertising content being stored by said server according to programming for determining a target consumer for said advertising content, said development component including means for providing at least one area within said content publication for displaying targeted advertising content, said order processing component including means for receiving information pertinent to classifying said order as deriving from a target consumer group, said order processing component further including means for determining appropriate advertising content from said stored advertising content for insertion as said targeted advertising content into said at least one area of said produced publication, and means for inserting said targeted advertising content into said at least one area.

38. An automated printing system, comprising:
   means for designing a content publication, said designing means enabling at least one member of a second user type as constrained by said at least one publication parameter, to establish at least one publication parameter and at least one publication production constraint for said content publication and further allowing said at least one first user type member to establish at least one criteria for receiving content contributions from at least one member of a second user type;
   means for receiving content from said at least one second user type member;
   means for developing said publication, said developing means including at least one user interface enabling a plurality of first user type members to collaborate in the development of said publication and manipulate said content as constrained by said at least one publication production constraint;
   means for proofing said publication by enabling at least one member of said first user type to render at least a portion of said publication for viewing electronically via a client device; and
   means for receiving approval of said portion of said publication from said first user type member, whereby said publication component can assemble said content associated with said portion of said publication into a format which can be directly processed by a raster image processing component, thereby producing said publication without the manual use of a pre-press tool.

39. A system for content processing and publication, comprising:
   a planning component enabling at least one member of a first user type from a first client device to establish at least one publication parameter and at least one publication production constraint for a content publication, and further allowing said at least one first user type member to establish at least one criteria for receiving content contributions from at least one member of a second user type;
   a development component enabling said at least one second user type member to upload at least image content to a server from a second client device, said server storing said content, said development component further enabling said at least one first user type member to retrieve said uploaded content for use in said publication as constrained by said at least one publication parameter and manipulate said content as constrained by said at least one production constraint, said development component capable of assembling said content in a vectorized graphics format;
   a proofing component enabling said at least one first user type member to render at least a portion of said publication in the form of a proof for viewing electronically via a client device; and
   a publication component for receiving approval of said proof from said first user type member, whereby said publication component can assemble said content associated with said proof into a format which can be directly processed by a raster image processing component, thereby producing said publication without the manual use of a pre-press tool.

* * * * *

UNITED STATES PATENT AND TRADEMARK OFFICE
CERTIFICATE OF CORRECTION

PATENT NO. : 6,898,601 B2
DATED : May 24, 2005
INVENTOR(S) : Amado et al.

It is certified that error appears in the above-identified patent and that said Letters Patent is hereby corrected as shown below:

Column 17,
Line 67, please replace the word "usemame" with -- username --.

Column 20,
Line 39, please replace the word "claims" with -- claim --; and
Line 66, please replace the word "convening" with -- converting --.

Column 22,
Line 46, please replace the word "portion" with -- a portion --.

Column 24,
Lines 5-13, please delete and insert the following:
    -- means for designing a content publication, said designing means enabling at least one member of a first user type to establish at least one publication parameter and at least one publication production constraint for said content publication and further allowing said at least one first user type member to establish at least one criteria for receiving content contributions from at least one member of a second user type as constrained by said at least one publication parameter; --.

Signed and Sealed this

Eleventh Day of October, 2005

JON W. DUDAS
*Director of the United States Patent and Trademark Office*